Patented May 20, 1941

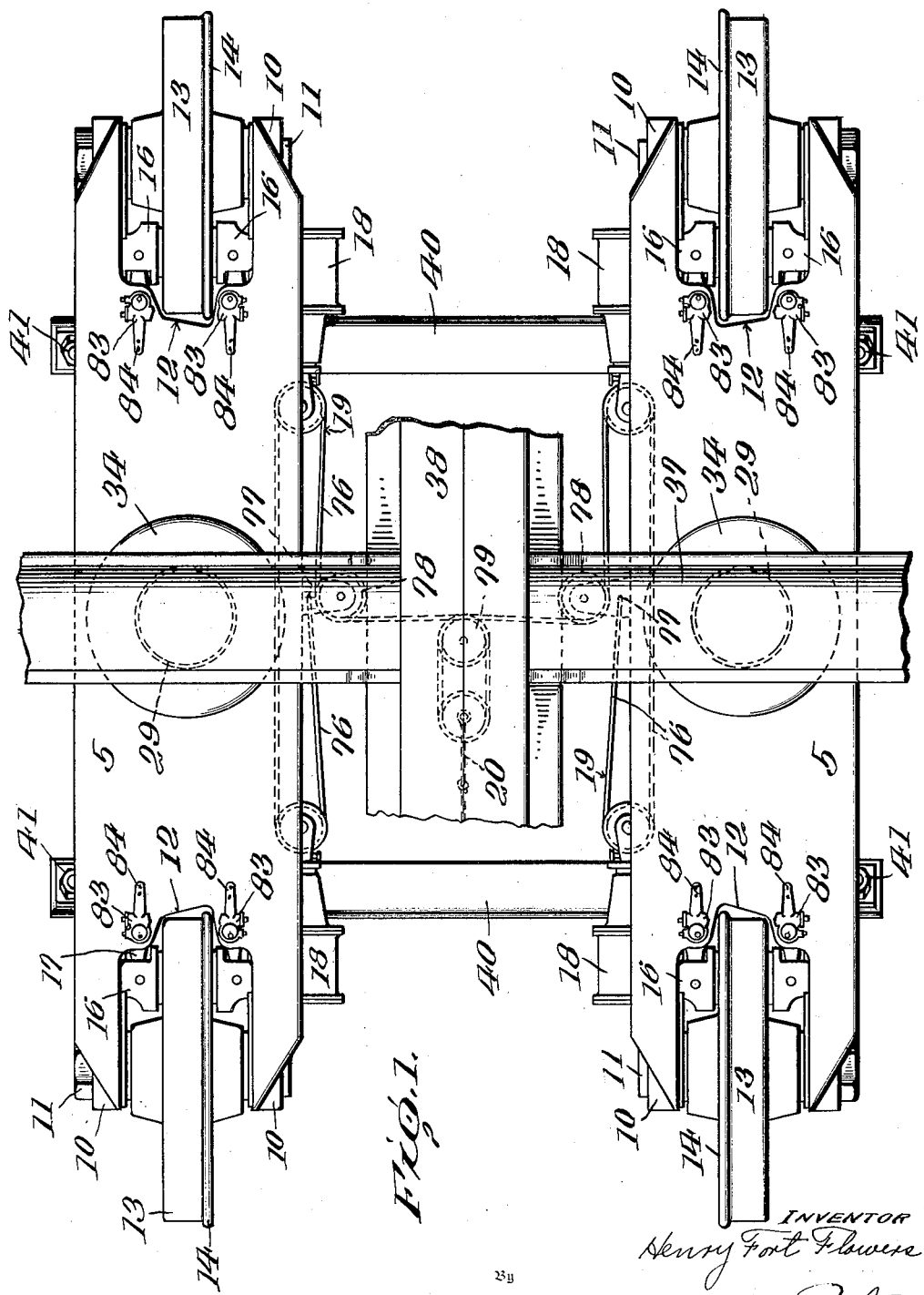

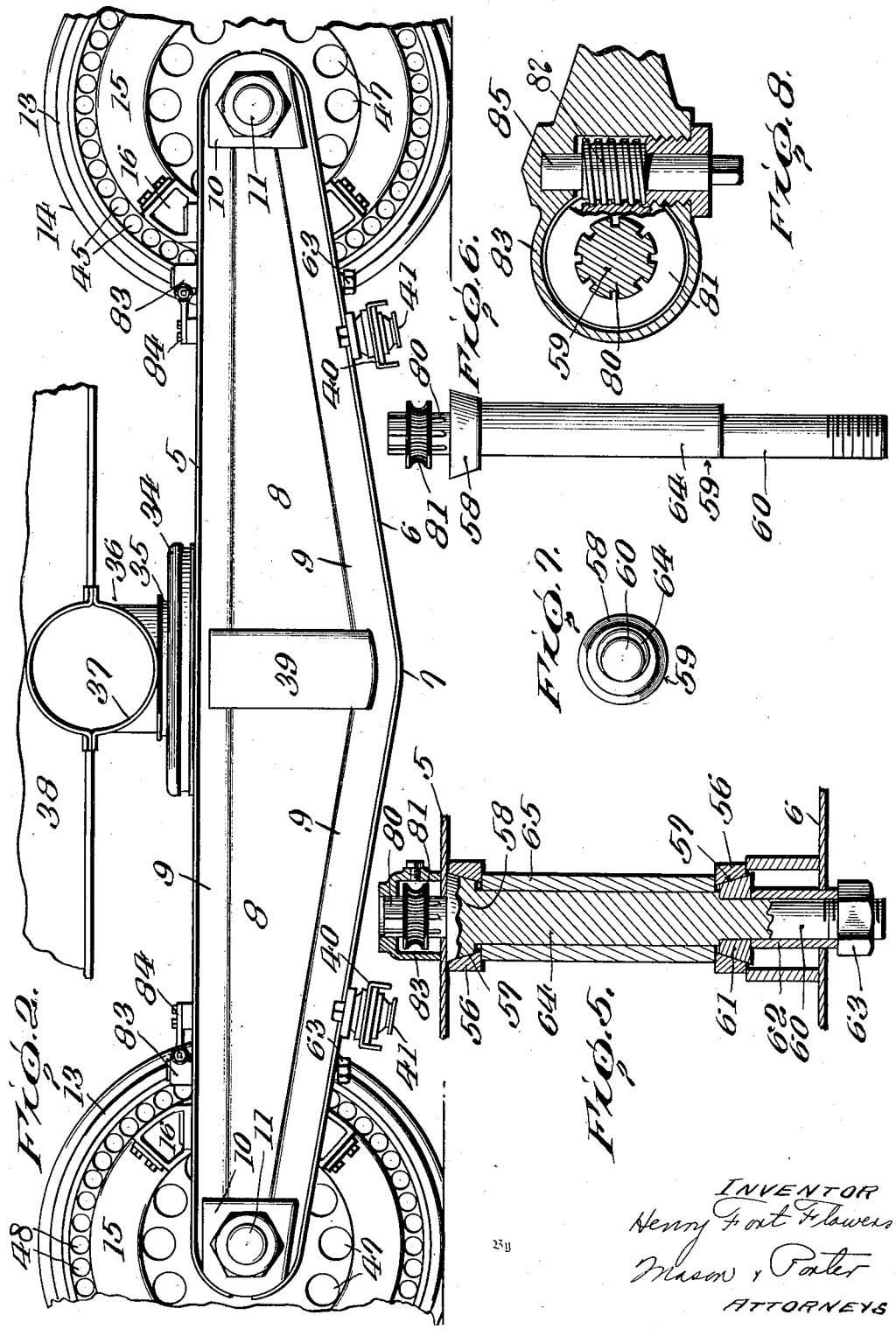

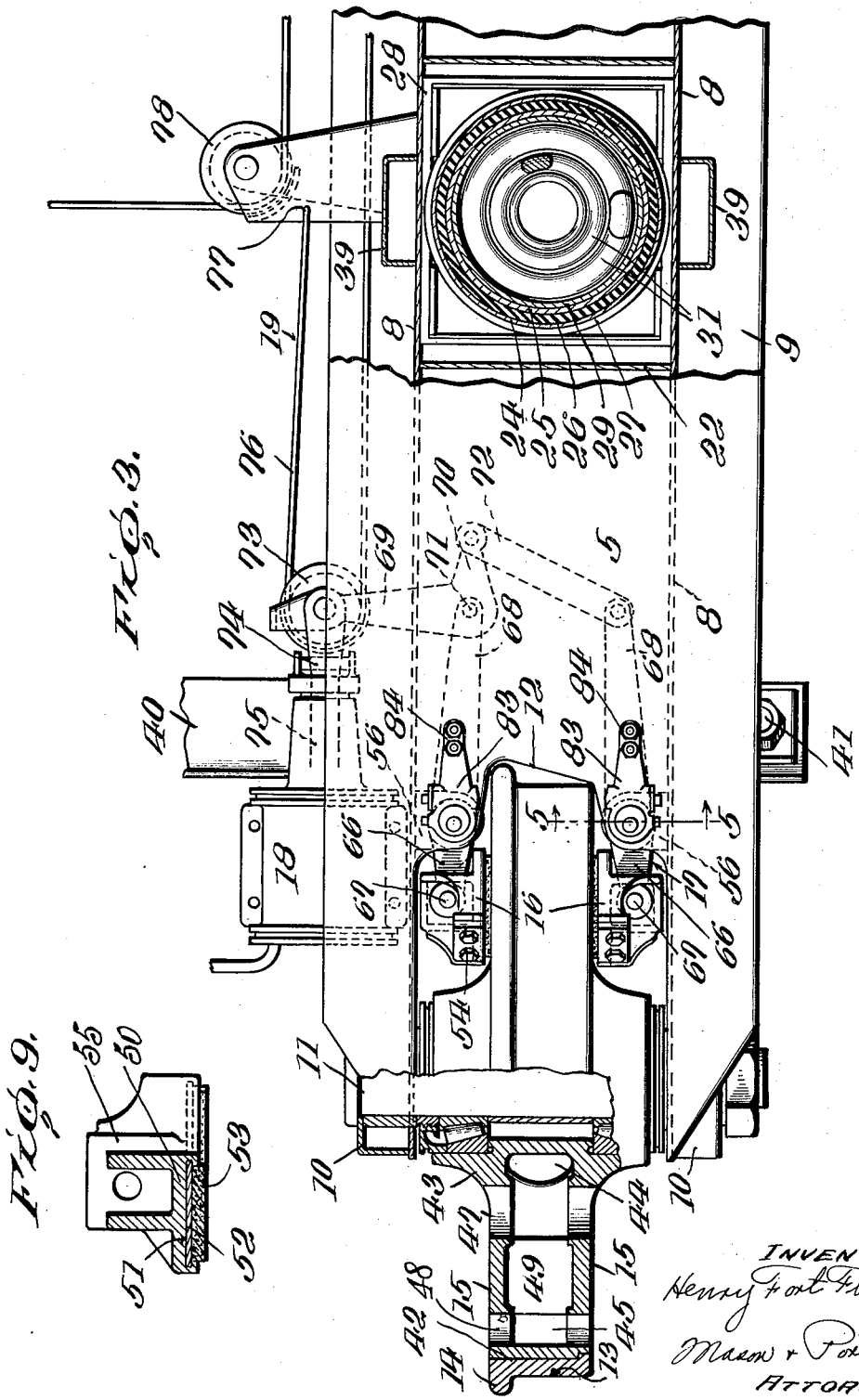

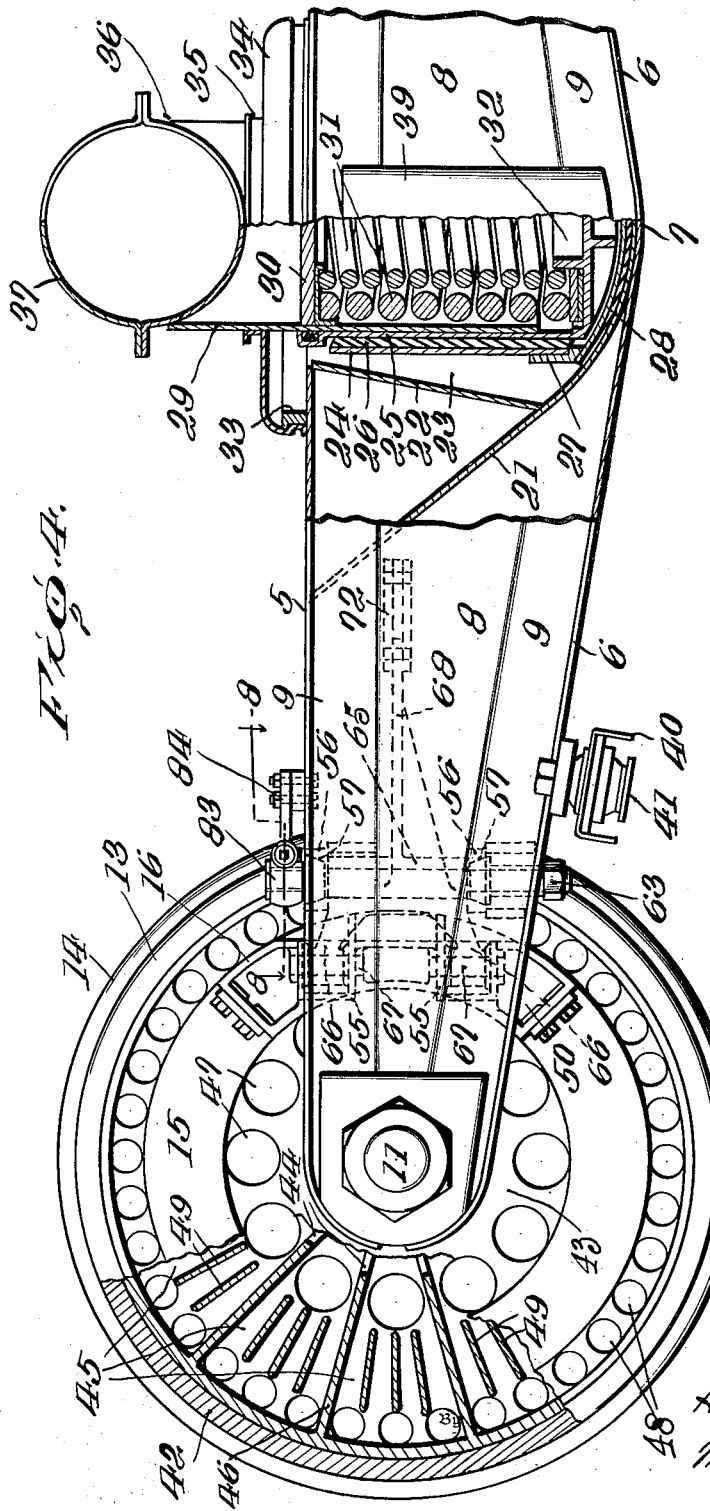

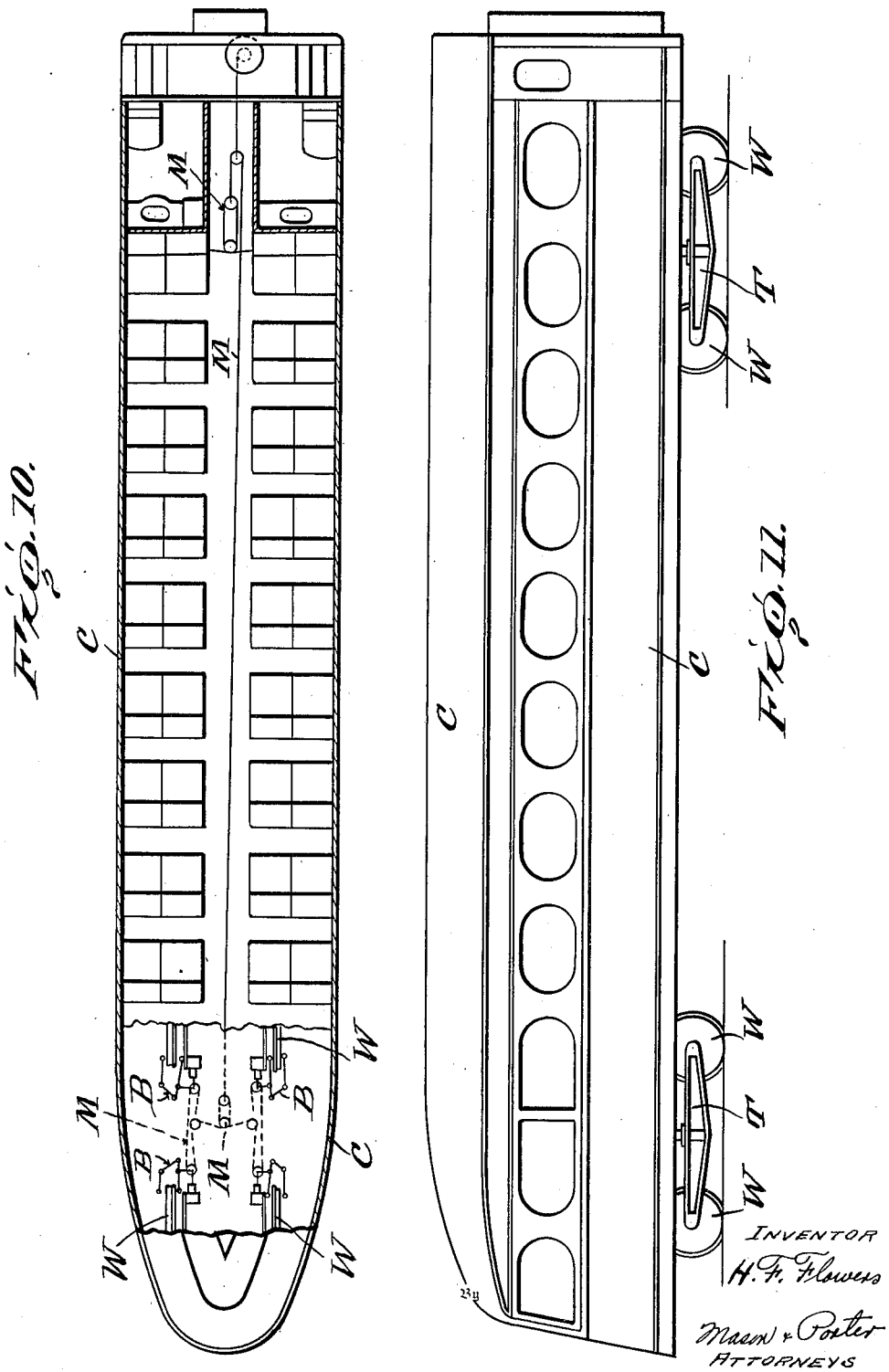

2,242,853

UNITED STATES PATENT OFFICE 2,242,853

BRAKING EQUIPMENT FOR TANDEM WHEEL TRUCK STRUCTURES

Henry Fort Flowers, Findlay, Ohio

Application May 20, 1939, Serial No. 274,848

11 Claims. (Cl. 188—59)

The invention relates generally to tandem wheel truck structures of the type disclosed in U. S. Letters Patent 2,063,545 and 2,078,915, issued on December 8, 1936, and April 27, 1937, respectively, to Henry Fort Flowers, and primarily seeks to provide certain new and useful improvements in braking equipments which are particularly adaptable to structures of this type.

In truck structures of the type stated, pairs of truck elements or units are independently pivoted to cross bolster structures and are tie bar connected so as to be maintained in substantially parallel relation. Each of these truck elements or units carries a pair of wheels disposed in tandem relation, and in providing braking equipments for wheels mounted in this fashion provision must be made for accommodating the independent movements of the individual truck elements without disrupting the braking equipment connections or controls.

It is therefore an object of the invention to provide novel braking equipments adaptable to use on tandem wheel truck units and including actuating and control devices which will permit independent movements of said units without interference with the efficiency of braking operations.

Another object of the invention is to provide a novel braking equipment of the disk or side application type in which brake shoes are simultaneously applied at opposite sides of each wheel.

Another object of the invention is to provide novel brake mounting and actuating devices including means for adjusting the relation of the brake shoes and the brake surfaces of the wheels.

Another object of the invention is to provide novel brake shoe structures including readily replaceable facings.

Another object of the invention is to provide a novel ventilated wheel structure including braking surfaces disposed in a novel manner for preventing separation of wheel body and tire structures due to excessive heat of friction generated during braking operations.

With the above and other objects in view that will hereinafter appear, the nature of the invention will be more clearly understood by following the detailed description, the appended claims, and the several views illustrated in the accompanying drawings.

In the drawings:

Figure 1 is a plan view of a truck structure embodying the invention.

Figure 2 is a side elevation of the structure shown in Figure 1.

Figure 3 is a detail plan view and part horizontal section of one of the truck elements or units.

Figure 4 is an enlarged side elevation of one of the braking equipments, parts being broken away and in section.

Figure 5 is a detail vertical cross section taken on the line 5—5 on Figure 3.

Figure 6 is a detail side elevation of one of the adjustable pivot pins.

Figure 7 is an inverted plan view of the pin shown in Figure 6.

Figure 8 is an enlarged detail horizontal section taken on the line 8—8 on Figure 4.

Figure 9 is a detail view illustrating one of the arcuate brake shoes.

Figure 10 is a somewhat diagrammatic part plan and part horizontal sectional view illustrating a stream-lined car with the invention embodied thereon.

Figure 11 is a side elevation of the car shown in Figure 10.

In the example of embodiment of the invention herein disclosed, each truck element includes horizontally disposed upper plating 5 and opposed lower plating 6 spaced from the upper plating and having a lower central point 7 and converging upwardly in the fore and aft direction toward said upper plating. The sides of each truck element are closed by a suitably spaced side plating 8, and the side and top and bottom plating is suitably reinforced by angle plates 9 welded to said plating.

Bearing boxes 10 are secured in spaced relation at each end of each truck element, and each pair of such boxes serves to support a stub axle 11 on which a wheel is rotatably mounted. Each wheel is accommodated in bifurcations 12 in the plating 5 and 6 and includes a tread surface 13, the usual flange 14 and laterally disposed brake ring portions 15.

The brake ring portions 15 are opposed by arcuate brake shoes 16 controlled by suitable actuator devices generally designated 17 and to which movement can be applied by application of fluid pressure, through the brake cylinder equipments generally designated 18, or manually through suitable tackle generally designated 19 and including a common pull connection 20. The specific construction of the wheels, of the brake equipments, and of the brake equipment controlling devices form the basis of the present invention and further detailed description thereof appears hereinafter.

Each truck element also includes central cradle plating 21 and well plating 22 spaced in the fore and aft direction with respect to the geometrical vertical center of the truck element and tilted up and inwardly in a manner for forming a gimbal well 23.

The well 23 accommodates the positioning of a gimbal structure composed of an outer shell or sleeve 24 and an inner shell or sleeve 25 concentric with and spaced a considerable distance inwardly of the outer sleeve. The sleeves 24 and 25 are separated by a live rubber cushion or sleeve 26 which is interposed between and vulcanized to said sleeves. This rubber sleeve allows the inner sleeve 25 to partake of a considerable amount of vertical and lateral movement within the outer sleeve 24.

The outer sleeve structure 24 also includes a bottom plate 27 which rests upon a rubber mat 28 interposed between the plate 27 and the cradle plating 21.

A king post sleeve 29 is telescopically mounted in the inner sleeve 25 and extends upwardly through the well 23 and includes an abutment partition 30. An equipment of nested compression springs 31 may be interposed between the partition 30 and the bottom member 32 of the inner gimbal sleeve 25.

An annular grooved mounting ring 33 is carried by each truck element top plating 5 in position for surrounding the respective king post well 23, and this ring is encircled by a flexible dust guard 34 which grips the king post sleeve 29 as at 35. The king post sleeves 29 of each complementary pair of truck elements or units are secured as at 36 to a cross bolster 37 which may comprise a cylindrical body formed of flange-secured half portions. The cross bolsters serve to secure complementary pairs of truck elements in generally parallel spaced relation and the bolsters of each car are secured in longitudinally spaced relation by a suitable center beam structure 38 which is mounted upon and secured in any approved manner to the bolsters in the manner illustrated in Figures 1 and 2 of the drawings.

If desired, each truck element may be reinforced at each side of its king post equipment by suitable vertically disposed gusset elements 39.

A tie bar is connected across the truck elements toward the end of each complementary pair thereof. Each tie bar preferably comprises an inverted channel member 40 which is pivotally connected as at 41 to each of a complementary pair of truck elements at a point outside the track gage line in the manner illustrated in Figures 1 and 2 of the drawings. The tie bar members thus connected across between the truck elements cause said elements to move in unison. The tandem mounted wheels of the complementary truck elements are held to gage by the tie bars 40, and any time that a vertical plane passing through the centers of the king posts is not normal to the track at that point (normal meaning perpendicular to the tangent) the effective gage of the wheels is reduced, causing the wheel gage to be narrower than the track gage, and thus producing a fore-shortening effect. The tie bars being anchored to the truck frames at points outside of the track gage lines will force the truck elements outwardly when rounding curves and tend to compensate for this fore-shortening, or in other words, tend to cause the wheel gage lines to coincide with the track gage lines in the rounding of the curves. The resilient mounting of the gimbal elements will permit the necessary spreading of the truck elements.

The tread surfaces of the flanges 14 of each wheel hereinbefore mentioned only generally are formed on a steel alloy tread ring 42 which encompasses the main body portion 43 preferably formed of gray iron or other suitable braking surface material and which includes the hub structure and the brake ring portions 15 previously referred to. The laterally presented braking surfaces of the rings 15 preferably are polished over the whole area to be engaged by the brake shoes.

Each wheel is cored out to provide a central annular chamber 44 and a plurality of radial chambers 45 formed between radial partitions 46 merging with the periphery of the wheel body 43 and which terminate at their inner ends to form the annular chamber 44. Each lateral wall of the wheel body 43 is provided with an annular row of large inlet apertures 47 disposed just inside the brake rings 15, and with a similar row of smaller outlet apertures 48 just outside said rings. Each chamber 45 is divided between the inner and outer rows of apertures 47 and 48 into four radial sub-passages by three radial partition members or blades 49.

As each wheel rotates, air will be drawn into the inlet apertures 47 adjacent the hub and will be expelled through the discharge apertures 48. The transverse radial fins 49 connecting and reinforcing the two side walls at the positions of the brake rings 15 serve as fan blades for increasing the velocity of the air as the speed of the wheel is increased. By reason of the provision of this ventilating equipment the wheel structures are efficiently cooled during travel of the vehicle, and the cooling effect increases as the speed increases so as to avoid excessive heating at high speeds.

In the improved wheel structure herein disclosed the heat of friction resulting from the application of the brake shoes to the lateral braking ring faces is dissipated by the wheel ventilating equipments, and by reason of the fact that the braking force is applied to the gray iron wheel portion 43 the heat generated tends to expand the inner wheel body into and tighten the tire rather than loosen it, as would be the case should the braking force be applied to the tire.

Each brake shoe 16 includes an arcuate body 50 having an undercut face groove 51 for removably receiving a mounting plate 52 having a fabric or composition braking material pad 53 affixed thereto. Each removably mounted brake surface equipment 52, 53 is held in place in its mounting groove by groove closure plates 54 one of which is mounted at each end of the respective brake shoe. Each brake shoe also includes a pair of vertically spaced and aligned actuator arm end mounting eyes 55.

At each side of each wheel each truck frame unit is provided with a vertically spaced pair of bearing lugs 56 having vertically aligned apertures therein equipped with coniform seats 57, the upper one of which seats receives the coniform head or collar 58 formed on a pivot pin 59 which is mounted in said lug apertures and includes a reduced concentric shank portion 60 at its lower end. A coniform collar 61 is secured on the lower end of each pin through the medium of a securing sleeve 62 and nut 63, said lower collar being positioned in the coniform seat in the lower bearing lug 56.

The center portion 64 of each pin 59 intervening the respective lugs 56 is eccentric as is shown in detail in Figures 6 and 7 of the drawings, and on each eccentric pin portion an actuator sleeve 65 is mounted. Each sleeve 65 has upper and lower brake shoe carrying arms 66 projected therefrom, and the free ends of these arms are pivotally secured at 67 in the respective brake shoe mounting eyes 55. Each sleeve 65 also includes a centrally disposed actuator arm 68 which projects therefrom in a direction opposite the direction of projection of the previously mentioned arms 66.

By reference to Figure 3 of the drawings it will be obvious that as the free ends of each cooperating pair of the actuator arms 68 are moved toward each other they will force the associated brake shoes away from the wheel disposed between them, whereas when said arm ends are moved in the opposite direction, or separated, the brake shoes will be applied to said wheel.

In order to impart the necessary movements to the actuator arms 68 for applying and releasing the brakes, the inner arm of each associated pair has mounted thereon a bell crank lever having a long arm 69 and a short arm 70, said lever being pivoted to the free end of the actuator arm as at 71. The short arm 69 is link-connected as at 72 to the free end of the other actuator arm 68, and the free end of the long arm 69 carries a pulley 73 and is connected as at 74 with the piston rod 75 of a brake cylinder 18 supported on the truck unit frame and to which fluid pressure is applied in any approved manner (not shown) for actuating the brakes by fluid pressure.

As has been previously stated the brakes may also be applied manually, and the tackle 19 hereinbefore referred to may include a cable 76 anchored as at 77 at each truck element side and passing over the bell crank carried pulleys 73 and idler pulleys 78 to the centrally disposed idler 79 associated with a common draft connection 20.

Each pin 59 includes a vertical concentric extension 80 having a worm wheel 81 secured thereon. Each worm wheel 81 is engaged by a worm 82 within a small housing 83 secured as at 84 to an adjacent portion of the truck frame, and shaft 85 of each worm is extended beyond the housing and squared to receive an adjusting tool. By rotating the worms 82, rotation can be imparted to the respective pins 59, and by reason of the provision of the eccentric portions 64 on said pins the positions of the actuator arms 66, 68 can be altered and the spaced relation of the brake shoes 16 with the brake rings 15 can be suitably changed.

The length of the pins 59, and particularly the eccentric portions 64 thereof, is sufficient to support the actuator arms for resisting the tendency of the brake shoes to rotate with the wheels when the brakes are applied.

In Figures 10 and 11 of the drawings, I have diagrammatically illustrated a stream-lined car with the invention embodied thereon. The car body is indicated at C, the truck bodies at T, the wheels at W, the braking equipments at B, and the manually operable brake applying devices at M.

The individual gimbal structures herein disclosed and by which the tandem wheel truck units are mounted on the king posts are specifically claimed in my co-pending application for United States Letters Patent filed May 20, 1939, and identified by Serial Number 274,847.

The tie bar or truck unit connecting structure herein generally disclosed is claimed in my co-pending application for United States Letters Patent filed May 20, 1939, and identified by Serial Number 274,846.

It is of course to be understood that the details of structure and arrangement of parts may be variously changed and modified without departing from the spirit and scope of my invention.

I claim:

1. In a truck structure, a wheel having laterally presented braking surfaces, a frame having a bifurcated portion in which the wheel is disposed and means thereon for rotatably supporting said wheel in the bifurcation, an individual brake shoe opposed to the braking surface at each side of said wheel, actuator levers fixedly pivoted intermediately of their ends and connected with and supporting said shoes at one end and movable to present said shoes to and withdraw them from said braking surfaces, said frame having parts extending into the bifurcation pivotally mounting said levers on the opposite sides of the wheel and between the periphery of the latter and its axis of rotation, and means including a bell crank lever pivotally connected to one said lever at its other end and link connected to the other lever at its other end for imparting movement of separation to said other lever ends thereby to force the first mentioned lever ends toward each other and the brake shoes against said braking surfaces.

2. In a truck structure, a wheel having laterally presented concentric annular braking surfaces, a frame having a bifurcated portion in which the wheel is disposed and means thereon for rotatably supporting said wheel, said frame having plating provided with parts on opposite sides of the wheel at the angles of the bifurcation, an individual brake shoe opposed to the braking surface at each side of said wheel, actuator levers supporting said shoes and movable to present said shoes to and withdraw them from said braking surfaces, means on the frame pivotally mounting the levers and extending through said parts, means for imparting movement to said levers, each said brake shoe being arcuate in shape and of uniform width and concentric with the associated wheel axis having an arcuate face grooveway therein, a plate having a braking material facing removably mounted in each grooveway, and means for removably securing said plates in place in said grooveways.

3. In a truck structure, a wheel having laterally presented braking surfaces, a frame having a bifurcated portion in which the wheel is disposed and means thereon for rotatably supporting said wheel, an individual brake shoe opposed to the braking surface at each side of said wheel, actuator levers supporting said shoes and movable to present said shoes to and withdraw them from said braking surfaces, means in the angles of the bifurcation including a pivot pin and a fixed bearing therefor for rockably supporting each lever on said frame, each said pin including an eccentric portion and being adjustable about its axis in its associated fixed bearing for altering the spaced relation of the brake shoes and the braking surfaces of the wheel, and means for imparting movement to said levers.

4. In a truck structure, a wheel having laterally presented braking surfaces, a frame and means thereon for rotatably supporting said wheel, an individual brake shoe opposed to the braking surface at each side of said wheel, actuator levers supporting said shoes and movable to present said shoes to and withdraw them from said braking surfaces, means including a pivot pin for rockably supporting each lever on said frame, each said pin including an eccentric portion and being adjustable about its axis for altering the spaced relation of the brake shoes and the braking surfaces of the wheel, means including a self-locking worm for imparting movement of adjustment to each said pin, and means for imparting movement to said levers.

5. In a truck structure, a wheel having laterally presented braking surfaces, a frame having a bifurcation in which the wheel is disposed and means thereon for rotatably supporting said wheel, an individual brake shoe opposed to the braking surface at each side of said wheel struck upon an arc concentric with the wheel axis and having upper and lower widely spaced pivotal bearing portions, a pair of upper and lower bearings in the angles of the bifurcation associated with each shoe widely spaced on and projecting rigidly from said frame, a pivot pin mounted in each pair of frame bearings, an actuator lever rockable on each pin and having carrier arm portions connected with the respective shoe bearing portions and an actuator arm portion, and means for imparting movement to said actuator arm portions for presenting the shoes to and withdrawing them from said braking surfaces.

6. In a truck structure, a wheel having laterally presented braking surfaces, a frame having a bifurcation in which the wheel is disposed and means thereon for rotatably supporting said wheel, an individual brake shoe opposed to the braking surface at each side of said wheel struck upon an arc concentric with the wheel axis and having upper and lower widely spaced pivotal bearing portions, a pair of upper and lower bearings in the angles of the bifurcation associated with each shoe widely spaced on and projecting from said frame, a pivot pin mounted in each pair of bearings, an actuator lever rockably mounted intermediate its ends on each pin to present oppositely directed relatively short and long arm portions, each short arm portion being attached to one brake shoe, and means including a bell crank lever pivotally connected to one long arm portion and link connected to the other long arm portion for imparting movement to said long arm portions for presenting the shoes to and withdrawing them from said braking surfaces.

7. In a truck structure, a wheel having laterally presented braking surfaces, a frame having a bifurcation in which the wheel is disposed, upper and lower plating on said frame, means on said frame for rotatably supporting said wheel, an individual brake shoe opposed to the braking surface at each side of said wheel struck upon an arc concentric with the wheel axis and having upper and lower widely spaced pivotal bearing portions, a pair of fixedly supported upper and lower bearings in the angles of the bifurcations associated with each shoe widely spaced on and projecting from said frame, portions of said plating extending into the angles of the bifurcations, a pivot pin mounted in each pair of upper and lower bearings and extending into the adjacent portions, an actuator lever rockable on each pin and having carrier arm portions connected with the respective shoe bearing portions and an actuator arm portion, each said pin including an eccentric portion between the respective pairs of upper and lower bearings and rockably supporting the respective actuator lever and being adjustable about its axis for altering the spaced relation of the brake shoes and the braking surfaces of the wheel, and means for imparting movement to said actuator arm portions for presenting the shoes to and withdrawing them from said braking surfaces.

8. In a truck structure, a wheel having laterally presented braking surfaces, a frame and means thereon for rotatably supporting said wheel, an individual brake shoe opposed to the braking surface at each side of said wheel struck upon an arc concentric with the wheel axis and having upper and lower widely spaced pivotal bearing portions, a pair of upper and lower bearings associated with each shoe widely spaced on and projecting from said frame, a pivot pin mounted in each pair of bearings, an actuator lever rockable on each pin and having carrier arm portions connected with the respective shoe bearing portions and an actuator arm portion, each said pin including an eccentric portion and being adjustable about its axis for altering the spaced relation of the brake shoes and the braking surfaces of the wheel, means including a self-locking worm for imparting movement of adjustment to each said pin, and means for imparting movement to said actuator arm portions for presenting the shoes to and withdrawing them from said braking surfaces.

9. In a truck structure, a wheel having laterally presented braking surfaces, a frame and means thereon for rotatably supporting said wheel, an individual brake shoe opposed to the braking surface at each side of said wheel, actuator levers supporting said shoes and movable to present said shoes to and withdraw them from said braking surfaces; and means for imparting movement to said levers including a bell crank lever pivotally connected to one said lever and link connected to the other, a brake cylinder having its fluid pressure actuated plunger connected to said bell crank lever, and manually operable means connected with said bell crank lever including a pulley mounted on said bell crank lever and a cable trained therearound, said brake cylinder and manually operable means being optionally operable.

10. In a tandem wheel truck structure, a transverse bolster, a truck unit frame disposed longitudinally of and pivotally secured to each end of the bolster, a pair of wheels mounted in tandem relation at the respective ends of each frame, each said wheel having laterally presented braking surfaces, a pair of brake shoes opposed to the braking surfaces of each wheel, a pair of actuator levers supporting each pair of shoes and movable to present said shoes to and withdraw them from the braking surfaces which they oppose, a bell crank lever pivotally connected to one lever of each said pair and link connected to the companion lever of said pair, a pulley mounted on each bell crank lever and a single cable anchored at its ends and trained over all of said pulleys and connected with a common draft means whereby movement can be manually and simultaneously imparted to the bell crank levers and actuator levers.

11. In a tandem wheel truck structure, a transverse bolster, a truck unit frame disposed longitudinally of and pivotally secured to each end of the bolster, a pair of wheels mounted in tandem relation at the respective ends of each frame, each said wheel having laterally presented braking surfaces, a pair of brake shoes opposed to the braking surfaces of each wheel, a pair of actuator levers supporting each pair of shoes and movable to present said shoes to and withdraw them from the braking surfaces which they oppose, a bell crank lever pivotally connected to one lever of each said pair and link connected to the companion lever of said pair, a pulley mounted on each bell crank lever and a single cable anchored at its ends and trained over all of said pulleys and connected with a common draft means whereby movement can be manually and simultaneously imparted to the bell crank levers and actuator levers, and brake cylinders having their fluid pressure actuated plungers individually connected with the bell crank levers, said brake cylinders and said manually operable means being optionally operable for brake actuation purposes.

HENRY FORT FLOWERS.